US009061574B2

(12) United States Patent
Ertl (10) Patent No.: US 9,061,574 B2
(45) Date of Patent: Jun. 23, 2015

(54) WINDOW FRAME (75) Inventor: Harald Ertl, Eichenau (DE)

(73) Assignee: CADEA GESELLSCHAFT FUR ANWENDUNG AND REALISIERUNG COMPUTERUNTERSTUTZTER SYSTEME MBH (DE)

( * ) Notice: Subject to any disclaimer, the term of this patent is extended or adjusted under 35 U.S.C. 154(b) by 118 days.

(21) Appl. No.: 13/132,478

(22) PCT Filed: Dec. 3, 2009

(86) PCT No.: PCT/EP2009/008640
§ 371 (c)(1),
(2), (4) Date: Jul. 13, 2012

(87) PCT Pub. No.: WO2010/063477
PCT Pub. Date: Jun. 10, 2010

(65) Prior Publication Data
US 2012/0274102 A1 Nov. 1, 2012

(30) Foreign Application Priority Data
Dec. 4, 2008 (DE) .......................... 10 2008 060 448

(51) Int. Cl.
B60J 10/02 (2006.01)
B60J 10/00 (2006.01)
B60J 10/04 (2006.01)
B60J 10/08 (2006.01)

(52) U.S. Cl.
CPC ............ B60J 10/02 (2013.01); *Y10T 29/49908* (2015.01); B60J 10/0051 (2013.01); B60J 10/0062 (2013.01); B60J 10/041 (2013.01); B60J 10/088 (2013.01)

(58) Field of Classification Search
CPC ............ B60J 10/02; B60J 10/04; B60J 10/06
USPC ................ 52/287.1, 716.5, 717.01; 296/1.08; 428/31; D12/190
See application file for complete search history.

(56) References Cited

U.S. PATENT DOCUMENTS

| | | | | | |
|---|---|---|---|---|---|
| 2,793,071 | A | * | 5/1957 | Meyer | 296/200 |
| 3,744,201 | A | * | 7/1973 | Dochnahl | 52/204.597 |
| 3,968,613 | A | | 7/1976 | Meyer | |
| 4,147,006 | A | * | 4/1979 | Kruschwitz | 52/204.599 |
| 4,160,052 | A | * | 7/1979 | Krysiak et al. | 428/31 |
| 4,245,450 | A | * | 1/1981 | Narita | 52/717.04 |
| 4,365,443 | A | * | 12/1982 | Miura | 49/502 |
| 4,650,240 | A | * | 3/1987 | Rinella | 296/93 |
| 4,738,069 | A | * | 4/1988 | Williams | 52/658 |
| 4,758,039 | A | | 7/1988 | Ohhazama et al. | |
| 4,800,681 | A | * | 1/1989 | Skillen et al. | 49/440 |
| 5,154,471 | A | * | 10/1992 | Mimura et al. | 296/93 |
| 5,358,764 | A | * | 10/1994 | Roberts et al. | 428/31 |
| 5,480,207 | A | * | 1/1996 | Gold | 296/93 |
| 5,525,174 | A | * | 6/1996 | Gold | 156/108 |
| 5,557,890 | A | * | 9/1996 | Levy et al. | 49/502 |
| 5,743,047 | A | * | 4/1998 | Bonne et al. | 49/490.1 |
| 5,860,688 | A | * | 1/1999 | Biondo et al. | 296/93 |
| 6,082,048 | A | * | 7/2000 | Backes et al. | 49/377 |
| 6,189,198 | B1 | * | 2/2001 | Keeney et al. | 29/527.4 |
| 6,220,650 | B1 | * | 4/2001 | Davis et al. | 296/146.16 |
| 6,817,651 | B2 | * | 11/2004 | Carvalho et al. | 296/146.2 |
| 7,918,058 | B2 | * | 4/2011 | Debailleul et al. | 52/204.53 |
| 8,151,521 | B2 | * | 4/2012 | Iwabuchi | 49/502 |
| 8,919,846 | B2 | * | 12/2014 | Maass | 296/1.08 |
| 2001/0010417 | A1 | * | 8/2001 | Goto et al. | 277/637 |
| 2006/0179786 | A1 | * | 8/2006 | Kreye | 52/716.5 |
| 2008/0007083 | A1 | * | 1/2008 | Kinoshita et al. | 296/93 |
| 2009/0071076 | A1 | | 3/2009 | Ludtke et al. | |
| 2011/0179628 | A1 | * | 7/2011 | Kreye | 29/450 |
| 2012/0153659 | A1 | * | 6/2012 | Senge | 296/93 |

FOREIGN PATENT DOCUMENTS

| | | | | |
|---|---|---|---|---|
| DE | 4314123 | A1 | 11/1994 | |
| DE | 60021910 | T2 | 4/2006 | |
| DE | 102005028738 | B3 | 3/2007 | |
| DE | 102006021190 | A1 | 11/2007 | |
| EP | 0431964 | A2 | 6/1991 | |
| FR | 2912348 | A1 | 8/2008 | |
| GB | 2371070 | A | 7/2002 | |
| JP | 2000094967 | A * | 4/2000 | ............... B60J 10/08 |
| JP | 2000203270 | A * | 7/2000 | ............... B60J 10/02 |
| JP | 2002-103986 | A | 4/2002 | |
| WO | 00/73097 | A1 | 12/2000 | |
| WO | 01/34933 | A1 | 5/2001 | |
| WO | WO 2007003823 | A2 * | 1/2007 | ............... B60J 10/00 |

OTHER PUBLICATIONS

International Preliminary Examination Report on Patentability for PCT/EP2009/008640, international filing date of Dec. 3, 2009, 8 pages.

(Continued)

*Primary Examiner* — Glenn Dayoan
*Assistant Examiner* — Paul Chenevert
(74) *Attorney, Agent, or Firm* — Cantor Colburn LLP (57) ABSTRACT A window frame (7, 8, 8') for a window (4, 5, 6, 5', 6') of a passenger car, has at least one seal having one or a plurality of sealing profiles (17.1, 17.2, 17.3, 17.4, 18.1, 18.4) that abut one another at seams in the longitudinal direction of the seal, and further have a fastening profile cooperating with the seal and comprising one or more fastening profile pieces (13.1, 13.2, 13.3, 13.4) that abut one another on at least one seam in the longitudinal direction of the fastening profile. The fastening profile pieces (13.1, 13.2, 13.3, 13.4) have a metal ornamental molding (9, 10, 10.1, 10.2, 10.3) attached to them and a molding flange (14.1, 14.2, 14.3, 14.4) fastened with at least one fastening element (15.1, 15.2, 15.3, 15.4) to secure the fastening profile to the passenger car. The ornamental molding (9, 10) is crimped on the molding flange (14.1, 14.2, 14.4) of the fastening profile piece or pieces (13.1, 13.2, 13.3, 13.4) such that it covers the seam in one piece. The window frame may be produced by a defined method of construction.

26 Claims, 6 Drawing Sheets

(56) References Cited

OTHER PUBLICATIONS

English language abstract of German Patent Publication No. 10 2005 028 738 B3, published Mar. 22, 2007.
English language abstract of German Patent Publication No. 10 2006 021 190 A1, published Nov. 15, 2007.
English language abstract of German Patent Publication No. 43 14 123 A1, published Nov. 3, 1994.
English language abstract of German Patent Publication No. 600 21 910 T2, published Apr. 6, 2006.
English language abstract of French Patent Publication No. 291 23 48 A1, published Aug. 15, 2008.
English language abstract of Japanese Patent Publication No. 2002103986 A, published Apr. 9, 2002.
German Search Report for German Patent Application No. DE 10 2008 060 448.8-21, dated Jul. 9, 2009, 4 pages.
International Search Report for PCT/EP2009/008640, international filing date of Dec. 3, 2009, 3 pages.
Written Opinion for PCT/EP2009/008640, international filing date of Dec. 3, 2009, 6 pages.
English Translation of International Preliminary Examination Report on Patentability for PCT/EP2009/008640, international filing date of Dec. 3, 2009, 5 pages.

* cited by examiner

Fig.6

WINDOW FRAME

CROSS-REFERENCE TO RELATED APPLICATIONS

This application is a U.S. national stage application of International Application No. PCT/EP2009/008640, which has an international filing date of Dec. 3, 2009, and which claims priority to German patent application number DE 10 2008 060 448.8, filed Dec. 4, 2008.

BACKGROUND OF THE INVENTION

1. Field of the Invention

The invention relates to a window frame for a window of a passenger car, comprising at least one seal having one or a plurality of sealing profiles that abut one another at seams in the longitudinal direction of the seal, and further comprising a fastening profile cooperating with the seal, wherein the fastening profile comprises one or a plurality of fastening profile pieces that abut one another on at least one seam in the longitudinal direction of the fastening profile, and wherein the fastening profile pieces have attached thereto a metal ornamental moulding. Furthermore, the invention also relates to a method of producing the window frame.

2. Description of Related Art

In the automotive industry such window frames have already been known for a long time. Via the seals of the window frames the interior of the passenger car is sealed to the outside in the area of the edges of the side windows so that dust and liquids are prevented from penetrating into the passenger car. In addition, the window frames serve to take up wind loads and reduce noise. In luxury class vehicles it is known to cover these seals or the whole window frame by ornamental mouldings, for example, chromium-plated ornamental mouldings, so as to achieve a visually appealing outward appearance of the passenger car.

DE 43 14 123 A1 discloses a door for a motor vehicle provided with a window frame which consists of frame parts and which is intended for a window pane. The window frame has associated therewith at least one sealing element which seals the window pane from the window frame and/or seals the window frame from surrounding vehicle parts, such as the vehicle roof. The sealing element is configured such that includes a reception means into which an ornamental moulding is inserted. To this end, the ornamental moulding is provided with a fastening element received in a reception means provided in the seal. The ornamental moulding extends adjacent the upper edge of the window frame and is therefore only provided on one side of the window pane. Hence, the ornamental moulding does not have any major bends. In view of the fact that the ornamental moulding includes an integrated fastening element, it is difficult to achieve the desired surfaces structure or surface finish of the ornamental moulding.

Similar sealing arrangements and ornamental mouldings are known from DE 10 2005 028 738 B3 and DE 10 2006 021 190 A1. Also DE 600 21 910 T2 discloses a sealing element for a sealing arrangement of a vehicle window which has inserted therein an ornamental moulding having a T-shaped cross-section.

Also FR 2 912 348 shows a sealing arrangement for a vehicle window. An ornamental moulding can be clipped in position on the sealing profile of the sealing arrangement. In addition, it is described that the sealing profile has clips attached thereto and that the ornamental moulding is clipped in position thereon.

It is also known that, on each side of the vehicle or passenger car, the window or windows of the front and rear side doors are enclosed by a window frame so that the window frame forms a frame around all the side windows of one side of the vehicle. It follows that the fastening profile as well as the seals must be guided around the corners of the side windows. It is, however, difficult to bend the fastening profile, since this has the effect that also the elements with which the fastening profile is secured to the vehicle are bent and may therefore undergo deformation, which will make it more difficult to install the fastening profile on the vehicle.

It is therefore known to divide the fastening profile so that individual fastening profile pieces abut one another at the corners of the windows. The ornamental moulding arranged on the fastening profile pieces is divided as well. The seams are therefore open to the outside so that dirt and water can penetrate into these seams. Moreover, the divided ornamental moulding creates an unaesthetic optical impression.

It is therefore the object of the present invention to provide a window frame which is easy to install, but provides nevertheless a good sealing effect and contributes to a visually appealing overall impression of the passenger car.

BRIEF SUMMARY OF THE INVENTION

According to the present invention this object is achieved in that the fastening profile piece or pieces is/are provided with a moulding flange and with at least one fastening element for fastening the fastening profile to the passenger car, and that the ornamental moulding is crimped on the moulding flange of the fastening profile piece or pieces such that it covers the seam in one piece.

The term "seam" stands in this context for any kind of interruption or discontinuity in the fastening profile. For example, it is known to produce, at least in sub-areas of the fastening profile, interruptions or recesses so as to allow bending of the fastening profile. These interruptions or recesses are also seams according to the above definition.

By making use of a separate fastening profile for fastening the ornamental moulding to the passenger car, a separation between functionality and visual appearance is achieved. The fastening profile, as a functional component, allows the ornamental moulding to be fastened very effectively to the vehicle door. Since the ornamental moulding is separately produced and mounted, compromises with respect to the visual appearance of the ornamental moulding need not be made. The component used as an ornamental moulding is preferably a deep-drawn or stamped part. The desired visual appearance of the ornamental moulding can easily be accomplished in this way. The term "in one piece" means here that the ornamental moulding is not interrupted in the longitudinal direction, i.e., in the direction in which the edges of the side window extend. This means that the ornamental moulding does not have any seams either. It follows that the seams of the fastening profile pieces and/or of the sealing profiles are protected against external influences by means of the metal ornamental moulding, an ingress of dirt and liquids in the window frame being thus avoided. In view of the fact that the ornamental moulding encompasses the seams of the fastening profile pieces of the window frame, an aesthetic overall impression of the vehicle is achieved. The window frame is thus provided with a jointless outer surface. In addition, the ornamental moulding may have an arbitrary shape, since it is not fixedly connected to the fastening profile, but is coupled to the fastening profile pieces, and consequently, also to the seal or seals, only when the window frame is being produced. It is thus also possible to produce the window frame completely separately from the vehicle, and the complete window frame can easily be installed as a whole in the vehicle, since the fastening profile pieces are held together by the ornamental moulding.

It is true that GB 2 371 070 A discloses a one-piece ornamental moulding for a window frame of a vehicle door; this ornamental moulding is, however, not applied to fastening profile pieces, but directly to the frame of the vehicle door. Mounting the ornamental moulding on the vehicle door is complex and time consuming. When the ornamental moulding has been mounted on the vehicle door frame, it is still necessary to install the sealings.

An advantageous embodiment is so conceived that the fastening profile is provided with at least one undercut for inserting a seal or for attaching the fastening profile to a seal. Depending on the mounting direction, it is also possible to completely produce the window frame including the seal and to fix it to the passenger car, or to fix the seal to the passenger car and to apply then to the seals the fastening profile having the ornamental moulding crimped thereon. It may also be provided that the seal is fixed to the passenger car with clips and that the fastening profile is inserted in the clips or engages lockingly behind them.

According to a preferred embodiment, it may be provided that the fastening profile consists of an extrudable material, and that it is preferably an extruded metal profile, preferably an extruded aluminum profile. It is thus very easily possible to produce the fastening profile with the desired functionality. In the case of an extruded profile, for example, undercuts can be produced very easily, said undercuts allowing the fastening profile to be fixed to the passenger car and the seals to be fixed in position in the fastening profile. All extrudable materials, such as plastic, can be used for the fastening profile. For reasons of stability, metal, in particular aluminum, is preferably used.

One variant can be so conceived that the moulding flanges of the fastening profile pieces have different widths in the longitudinal direction of the fastening profile pieces. The desired width of the ornamental moulding and, consequently, the desired visual appearance is thus predetermined by the width of the moulding flanges of the fastening profile pieces. The ornamental moulding can simply be crimped onto the moulding flanges and need not be further processed subsequently.

A preferred embodiment is so conceived that the ornamental moulding is configured as an integral component throughout its length. The ornamental moulding may, for example, be a drawn part or a stamped part, i.e., neither the width nor the thickness of the ornamental moulding is composed of a plurality of strips either. The ornamental moulding is therefore provided with a non-interrupted external surface. The ornamental moulding comprises only one component, which holds the fastening profile pieces together, so that the window frame can be installed in the passenger car as one frame. Hence, the seams of the fastening profile pieces are not visible. The ornamental moulding can be provided with a very simple structural design, a sheet metal strip may be used by way of example.

According to an advantageous embodiment, it can be provided that the fastening profile pieces have different configurations. It is thus possible to adapt the fastening profile pieces to the mounting location and to the respective requirements through differently configured moulding flanges and/or fastening elements. For example, the fastening profile used on the lower side of a side window, i.e., on the breast of the vehicle door, may differ from the fastening profile used for the right or the left side of a side window or for a fixed window. Different sealing profiles may be used as well.

Another variant is so conceived that the at least one fastening element of the fastening profile pieces is inserted in the sealing profiles and that the fastening profile is fixed to the passenger car in this way. This will prevent contact between the fastening profile, which is preferably made of metal, and the frame of a door or the chassis of the passenger car, so that neither contact corrosion nor any other problems will arise.

It may, however, also be provided that the at least one fastening element of the fastening profile pieces is attached to a frame of the passenger car and that the fastening profile is fixed to the passenger car in this way. A reliable connection between the fastening profile pieces and the frame or chassis of the passenger car is thus accomplished, the seal or the sealing profiles can be clipped in position in the fastening profile pieces.

Another embodiment is so conceived that the window frame encloses a movable side window and a fixed side window. Hence, both said windows can be enclosed by the same frame, a visually appealing overall impression of the vehicle side is created.

Furthermore, it may also be provided that the window frame encloses only a portion, that is, only a sub-area of a window. Also in this sub-area the ornamental moulding covers the seams between the fastening profile pieces. A separation between functionality (fastening profile) and visual appearance (ornamental moulding) is accomplished. The ornamental moulding may, for example, only enclose a fixed side window. This is advantageous, for example, for use with coupes.

In addition, the invention also relates to a method of producing a window frame according to the present invention. The method comprises the following steps:
  providing at least one fastening profile piece provided with a moulding flange, said moulding flange having an excess width,
  processing the moulding flange of the at least one fastening profile piece along its width such that the desired shape of the moulding flange is obtained, and
  crimping the ornamental moulding onto the processed moulding flange It is thus possible to provide a window frame with an ornamental moulding having different widths along its length, whereby the desired visual appearance of the window frame is achieved. By separating the functional component, i.e., the fastening profile piece, which allows the window frame to be fixed to the passenger car, from the optical component, i.e., the ornamental moulding, a window frame can be produced, which has the desired visual appearance and the desired surface structure, respectively, and which nevertheless allows the seal to be fixed effectively and easily to the passenger car.

According to a preferred embodiment, the width of the moulding flange is subjected to cutting so that the moulding flange will have different widths in the longitudinal direction of the fastening profile piece. By means of cutting the moulding flange can be processed machined very easily.

Another variant of the method can be so conceived that a plurality of fastening profile pieces is provided, that the moulding flanges of the fastening profile pieces are processed and that the ornamental moulding is crimped onto the moulding flanges of all the fastening profile pieces. As has already been described, a jointless outer surface of the window frame is obtained in this way. The desired visual appearance is achieved.

Still another variant of the method can be so conceived that the at least one fastening profile piece has at least one undercut, and that at least one sealing profile is installed in said undercut. This allows the seal or the sealing profiles to be fixed to the fastening profile piece in a particularly simple manner.

BRIEF DESCRIPTION OF THE SEVERAL VIEWS OF THE DRAWINGS

In the following, embodiments of the invention will be explained in more detail on the basis of a drawing, in which.

DETAILED DESCRIPTION OF THE INVENTION

Figure 1:
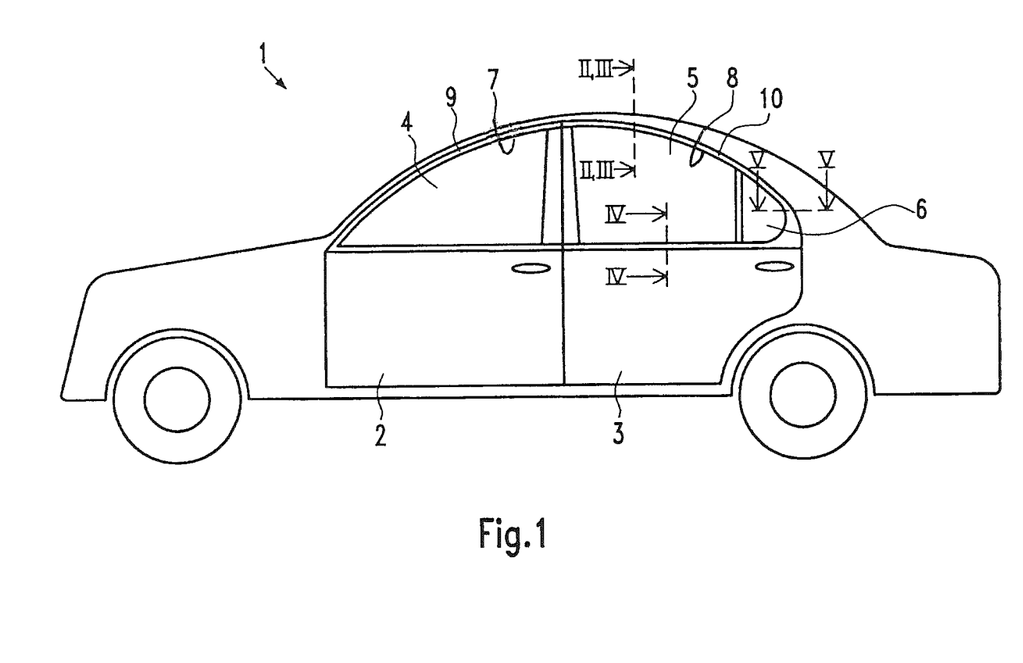
FIG. 1 shows a side view of a passenger car with two vehicle doors with a window frame.

FIG. 1 shows a side view of a passenger car 1 with a front side door 2 and a rear side door 3. Both the front side door 2 and the rear side door 3 have arranged therein movable side windows 4, 5. In the rear side door 3 a fixed small side window 6 may additionally be arranged. The small fixed side window 6 is arranged in the rear corner area of the side window opening in the rear side door 3. Such a fixed small side window may also be arranged in the front side door 2 and is then arranged in the front corner area of the side window 4.

The front side door 2 as well as the rear side door 3 have each arranged thereon a window frame 7, 8. By means of the window frame 7 of the front side door 2, the movable front side window 4 in the front side door 2 is held in position. The rear window frame 8 serves to fasten the rear fixed side window 6 in the rear side door 3 and to hold the rear movable side window 5 in position.

The front window frame 7 and the rear window frame 8 enclose the edges of the front side window 4 and of the rear side windows 5, 6, with the exception of the area in which the front side door 2 and the rear side door 3 adjoin one another. In this area, i.e., in the area in which the front side door 2 and the rear side door 3 contact each other, the front window frame 7 and the rear window frame 8 abut one another. This creates the optical impression of a closed frame around the side windows 4, 5, 6. This impression is intensified by the circumstance that the front window frame 7 as well as the rear window frame 8 are provided with a circumferentially extending ornamental moulding 9, 10 which is optically distinct from the passenger car 1. It follows that neither the ornamental moulding 9 nor the ornamental moulding 10 have a seam, but they abut one another, just as the front window frame 7 and the rear window frame 8, in the area in which the front side door 2 and the rear side door 3 are in contact. The ornamental mouldings 9, 10 consist of a metal material and are preferably chromium plated. The material used for the ornamental mouldings 9, 10 may, for example, be aluminum.

Figure 2:
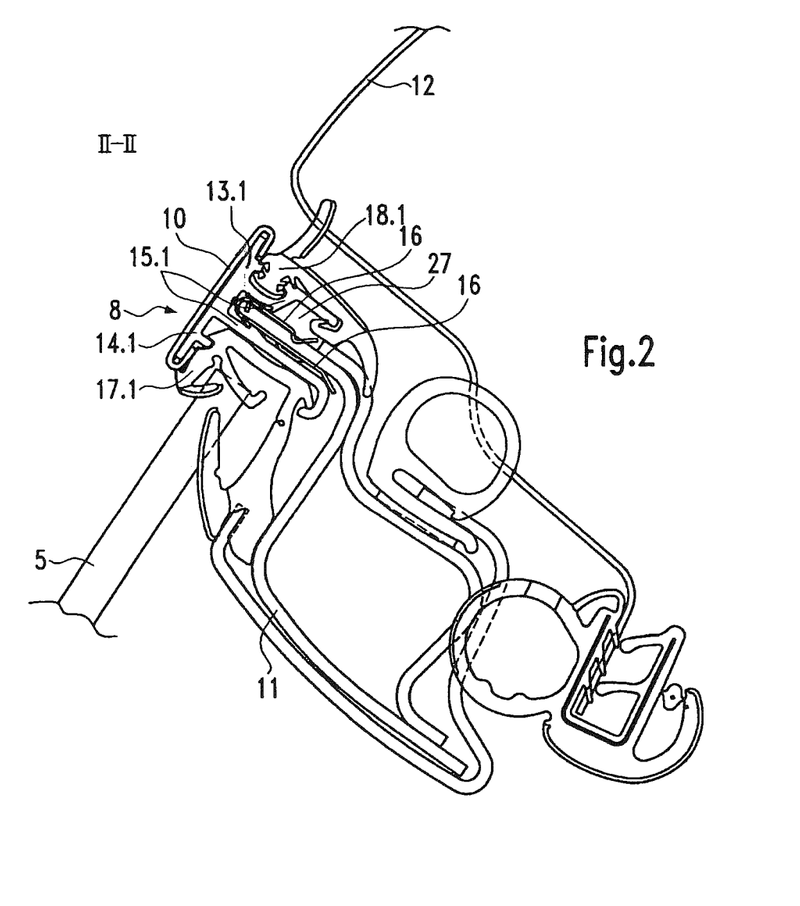
FIG. 2 shows a sectional view of the window frame along line II-II of FIG. 1.

FIG. 2 shows a sectional view of the rear window frame 8 and the adjoining areas along line II-II in FIG. 1. The structural design of the front window frame 7 can preferably be identical to that of the rear window frame 8. Hence, the following description can also be transferred to the front window frame 7.

The rear window frame 8 is secured to the frame 11 of the rear side door 3 and defines a reception means for the movable rear side window 5. In addition, the window frame 8 defines the transition from the rear side door 3 to the vehicle roof 12.

The rear window frame 8 comprises at least one fastening profile piece 13.1 comprising a moulding flange 14.1 for the ornamental moulding 10 and two fastening elements 15.1. The ornamental moulding 10 is secured to the moulding flange 14.1. This is done by crimping.

By means of the fastening elements 15.1, the fastening profile piece 13.1 is attached to the frame 11 of the rear side door 3. The two fastening elements 15.1 define a substantially U-shaped reception duct 27 having inserted therein clips 16. The clips 16 guarantee that the fastening profile piece 13.1 is fixedly held on the frame 11 of the rear side door 3.

The fastening profile piece 13.1 has additionally inserted therein two sealing profiles 17.1, 18.1. To this end, the sealing profiles 17.1, 18.1 and the fastening profile piece 13.1 are provided with interengaging projections and recesses. The sealing profile 17.1 serves as a reception means for the movable side window 5 and is provided with suitable sealing lips on both sides as well as on the upper end of the side window 5. The sealing profile 18.1 seals the gap between the rear side door 3 and the vehicle roof 12 and comprises a sealing lip that abuts on the vehicle roof 12.

Figure 3:
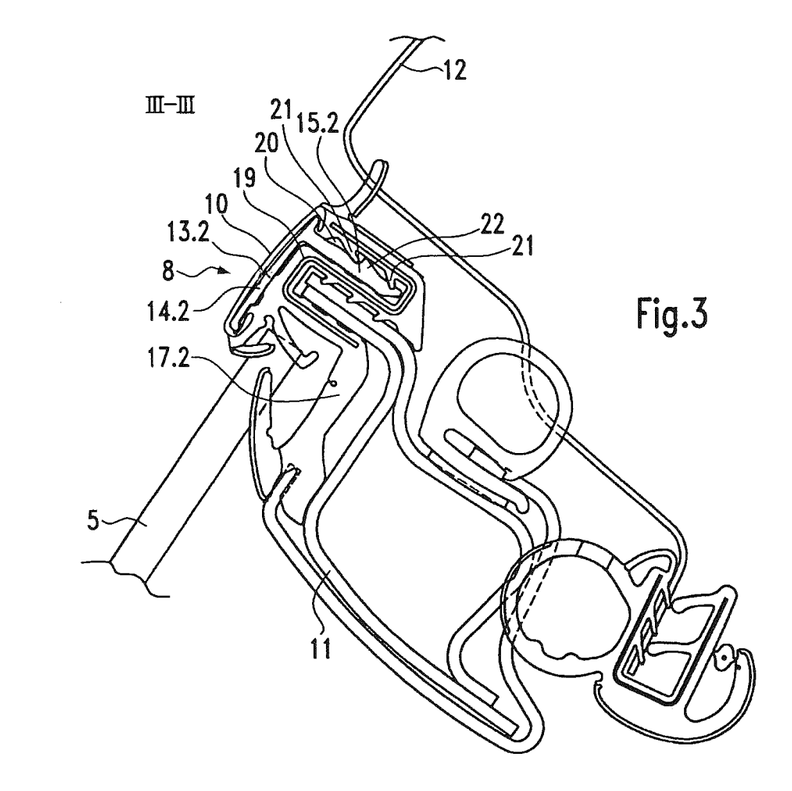
FIG. 3 shows a sectional view of another embodiment of the window frame along line III-III of FIG. 1.

FIG. 3 shows a further embodiment of a rear window frame 8 in a sectional view along line III-III in FIG. 1. Also the window frame 8 is secured to the frame 11 of the rear side door 3, it defines a reception means and seal for the movable rear side window 5 and it seals the rear vehicle door 3 from the vehicle roof 12.

The window frame 8 comprises a sealing profile 17.2 which is attached to the frame 11 of the rear side door 3. In order to allow the sealing profile 17.2 to be reliably retained on the frame 11, the sealing profile 17.2 has provided therein a metal core 19. The sealing profile 17.2 defines, on the one hand, the reception and sealing means for the window 5 and, on the other hand, it seals the vehicle door 3 from the vehicle roof 12. The sealing profile 17.2 is additionally provided with a reception means 20 in which the fastening profile piece 13.2 is accommodated.

Also the fastening profile piece 13.2 is provided with a moulding flange 14.2 for the ornamental moulding 10. The ornamental moulding 10 is consequently attached to the moulding flange 14.2 of the fastening profile piece 13.2. Preferably, the ornamental moulding 10 is crimped on the moulding flange 14.2. The moulding flange 14.2 has additionally attached thereto a fastening element 15.2, which is inserted into the reception means 20 of the sealing profile 17.2. In order to reliably retain the fastening element 15.2 in the reception means 20 of the sealing profile 17.2, the sealing profile 17.2 is provided with projections 21 which cooperate with barbs 22 of the fastening element 15.2 and prevent the fastening profile piece 13.2 from slipping out of the sealing profile 17.2.

As can be seen from FIG. 1, the front window frame 7 and the rear window frame 8 enclose the front window 4 and the rear window 5, respectively, on at least two sides. Hence, the front window frame 7 and the rear window frame 8 have, at the location at which the two sides of the window meet, a kink or a sharp bend. In order to avoid bends in the fastening profile, which would lead to deformations of the fastening profile and fastening elements, respectively, and which would it make more difficult to install the fastening profile on the frame 11 of the vehicle door, the fastening profiles can be divided. It is also possible to install in the area of the breast of the vehicle door a fastening profile piece which is different from that installed, for example, in the area of the lateral guide means of the side window, since the fastening profile pieces must fulfill different functions in these areas. The ornamental mouldings 9, 10 cover such seams at which fastening profile pieces or sealing profiles abut one another.

Figure 4:
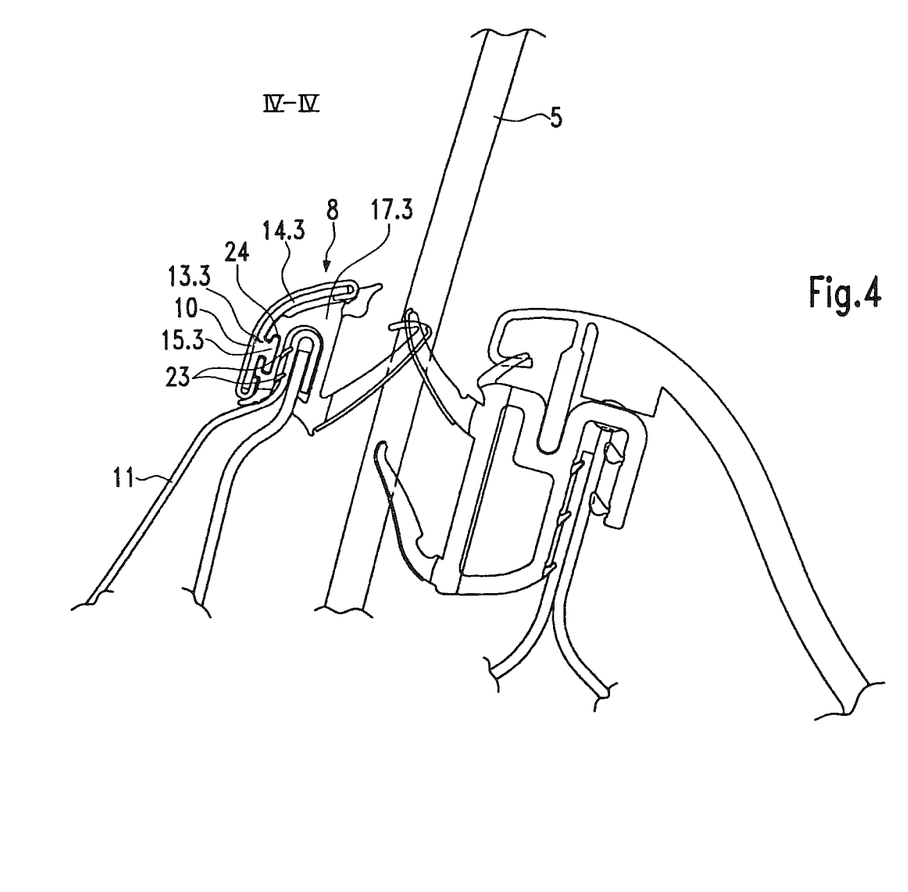
FIG. 4 shows a sectional view of the window frame along line IV-IV of FIG. 1.

FIG. 4 shows a sectional view of the window frame 8 on the lower edge of the vehicle window 5 along line IV-IV in FIG. 1.

The window frame 8 is again fixed to the frame 11 of the rear side door 3 and defines a sealing and guide means for the movable side window 5. The drawing also shows a sectional view of the inner area of the door.

The window frame 8 on the lower edge of the rear side window 5 of the passenger car 1 comprises again a sealing profile 17.3, a fastening profile piece 13.3 and an ornamental moulding 10. The sealing profile 17.3 is pushed onto the frame 11 of the rear side door 3 and clampingly fixed thereto. To this end, the sealing profile 17.3 may comprise a metal core (not shown). In addition, the sealing profile 17.3 has provided thereon projections 23 which allow the sealing profile 17.3 to be fixedly retained on the frame 11. Also the sealing profile 17.3 is provided with a reception means 24 into which the fastening element 15.3 of the fastening profile piece 13.3 can be inserted. Alternatively, the sealing profiles may also be fixed to the frame of the vehicle door by means of clips and the fastening profile pieces may be attached to said clips or they may lockingly engage behind said clips.

Depending on the mounting direction it is, however, also imaginable to insert the seals into the fastening profile piece or pieces and to fix the fastening profile piece directly to the frame of the side door by means of the fastening element or elements.

The fastening profile piece 13.3 additionally comprises a moulding flange 14.3 for the ornamental moulding 10. The ornamental moulding 10 is preferably crimped on the moulding flange 14.3.

Figure 5:
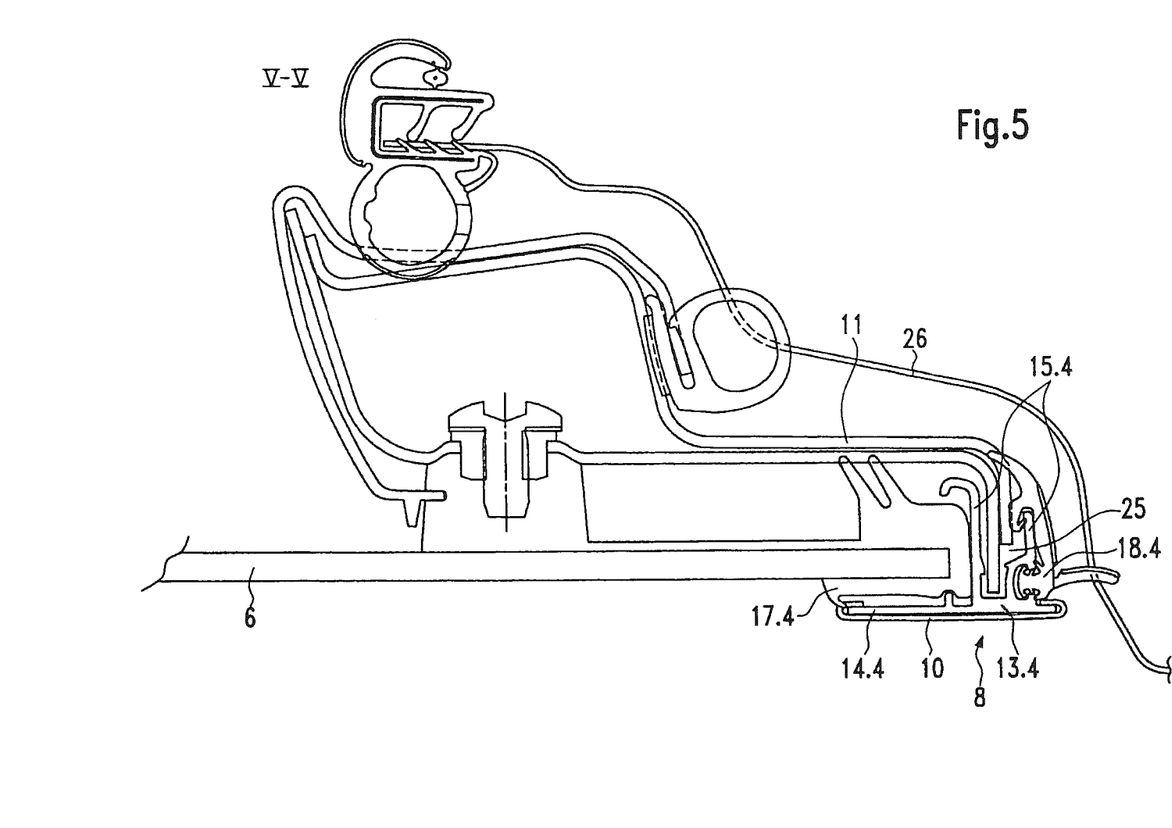
FIG. 5 shows a sectional view of the window frame along line V-V of FIG. 1.

As has already been described, the rear glazing of the passenger car 1 may consist of two parts and comprise a movable side window 5 and a small fixed side window 6. Also the fixed side window 6 is then enclosed by the window frame 8. FIG. 5 shows a sectional view of the rear window frame 8 in the area of the fixed rear side window 6 along line V-V of FIG. 1.

The window frame 8 comprises also in this area a fastening profile piece 13.4, sealing profiles and frames 17.4, 18.4 as well as the ornamental moulding 10. The fastening profile pieces have preferably different structural designs so that they can easily be adapted to the respective mounting location. The ornamental moulding 10 covers in one piece all the fastening profile pieces and, consequently, also all seams.

In view of the fact that the demands to be met in the area of the fixed rear side window 6 are different from those which are to be met in the area of the movable side window 5, a separate fastening profile piece 13.4 may also be provided in this case. Also the fastening profile piece 13.4 comprises a moulding flange 14.4 for the ornamental moulding 10. The ornamental moulding 10 is preferably crimped on the moulding flange 14.4. The moulding flange 14.4 of the fastening profile piece 13.4 has arranged thereon two fastening elements 15.4 defining a reception duct 25 which is attached to the frame 11 of the rear side door 3. In order to allow the fastening profile piece 13.4 to be reliably retained on the frame 11, a sealing profile 18.4 can be inserted into the fastening profile piece 13.4 and used for clampingly fixing said fastening profile piece 13.4 to the frame 11. The fastening profile piece 13.4 simultaneously seals the rear side door 3 in this area from the respective vehicle pillar 26, i.e., the C-pillar.

Via an additional enclosure frame or separate frame 17.4, the fixed side window 6 is connected to the door frame 11 and the fastening profile piece 13.4. Alternatively, it is also imaginable to fix the fastening piece 13.4 to the frame by means of clips or to implement the seal as an integral component and to insert the fastening profile piece into the seal and fix it thus to the frame of the side door.

The parts used as fastening profile or fastening profile pieces 13.1, 13.2, 13.3, 13.4 are preferably parts consisting of an extrudable material, preferably extruded metal parts, particularly preferred extruded aluminum parts. For insertion of the seals, the fastening profile or fastening profile pieces 13.1, 13.2, 13.3, 13.4 are preferably provided with undercuts.

In contrast to the fastening profile pieces 13.1, 13.2, 13.3, 13.4, the ornamental mouldings 9, 10 of the front side door 2 and of the rear side door 3 are not divided, but they extend in one piece over all fastening profile pieces 13.1, 13.2, 13.3, 13.4 and, consequently, they cover all seams. The ornamental moulding 9, 10 is preferably implemented as an integral component on each side door 2, 3 and may consist of a sheet metal strip. It is also possible to use drawn or stamped components as an ornamental moulding.

When the window frames 7, 8 are being produced, all the necessary fastening profile pieces 13.1, 13.2, 13.3, 13.4 and all the necessary sealing profiles 17.1, 17.2, 17.3, 17.4, 18.1, 18.2 are therefore joined and connected to one another. Depending on the structural design of the fastening profile pieces and of the sealing profiles, the sealing profiles will be inserted into the fastening profile pieces or, vice versa, the fastening profile pieces into the sealing profiles. The ornamental moulding 9, 10 is crimped onto the moulding flanges 14.1, 14.2, 14.3, 14.4 of the resultant divided frame. It is also possible to use only one fastening profile piece which extends over the whole length of the window frame, the moulding being then crimped onto the moulding flange of said fastening profile piece. The resultant complete frame, i.e., the window frame 7, 8, can then be easily be installed, as a fully prefabricated unit, into the respective side door 2, 3 of the passenger car 1. The seams of the fastening profile pieces 13.1, 13.2, 13.3, 13.4 are thus covered outwards by the ornamental moulding 9, 10 and hidden from view.

The ingress of dirt, dust and liquids into the window frame 7, 8 and thus possibly into the vehicle interior is avoided. In addition, a visually appealing outward appearance of the passenger car 1 is achieved.

As can be seen from FIGS. 1 to 5, the moulding flange 14.1, 14.2, 14.3, 14.4 of the fastening profile pieces 13.1, 13.2, 13.3, 13.4 can have various widths in the longitudinal direction of said fastening profile pieces 13.1, 13.2, 13.3, 13.4. This allows the fastening profile pieces 13.1, 13.2, 13.3, 13.4 to be adapted to the different mounting locations, they can, for example, accommodate different sealing profiles. In addition, the visual appearance of the window frame 7, 8 can be influenced and designed. The fastening profile pieces 13.1, 13.2, 13.3, 13.4 are preferably made of a metal material, said fastening profile pieces being, for example, extruded aluminum profiles. Also in cases in which only one fastening profile piece is used, said fastening profile piece is preferably an extruded aluminum profile.

Figure 6:
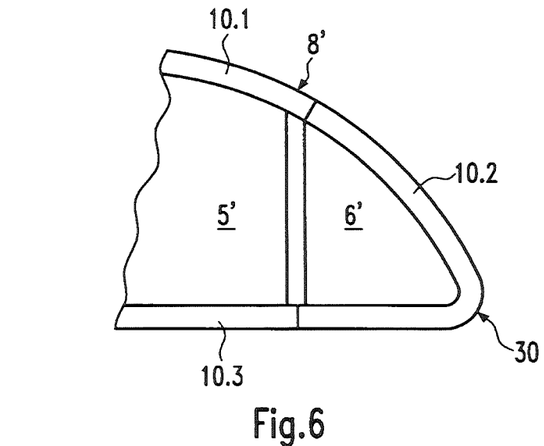
FIG. 6 shows a side view of another embodiment of a window frame.

FIG. 6 shows a further embodiment of a window frame 8'. The window frame 8' encloses a movable side window 5' and a fixed side window 6'. Also in this case, the window frame 8' again comprises fastening profile pieces (not shown), which can be connected to sealing profile pieces. The fastening profile pieces abut one another at seams. Ornamental mouldings 10.1, 10.2, 10.3 are attached to the fastening profile pieces. The ornamental moulding 10.2 encloses the fixed side window 6' on at least two sides and covers at least two fastening profile pieces abutting one another at a seam in the corner 30 of the side window 6'. The ornamental moulding 10.2 thus encloses only a part of the side windows 5', 6' and covers, in so doing, a seam of fastening profile pieces. As for the rest, the window frame is implemented as described hereinbefore.

It is also known to use hardened fastening profiles or fastening profile pieces. The fastening profiles or fastening profile pieces can then fulfill a support function. In order to follow the shape of the window, the fastening profiles must be bent, at least partially. In the case of the hardened fastening profiles this is impossible, or at least difficult. Hence, recesses are formed, for example, by cutting, at least in sub-areas of the fastening profiles or fastening profile pieces. Also these recesses or interruptions or discontinuities in the fastening profile are seams.

In the following, a method of producing a window frame according to the present invention is described in more detail. For producing the window frame, a fastening profile or a plurality of fastening profile pieces 13.1, 13.2, 13.3, 13.4 is first provided, said fastening profile or fastening profile pieces having a moulding flange 14.1, 14.2, 14.3, 14.4. The fastening profile or fastening profile pieces 13.1, 13.2, 13.3, 13.4 are preferably produced by extrusion and have thus the advantages of an extruded part. For example, undercuts can be provided, and the sealing profiles can be clipped in position therein. The moulding flange of the fastening profile or fastening profile pieces has an excess width, which is at least as large as the maximum desired moulding flange width. The moulding flanges are then processed, for example, by cutting, until the desired moulding flange shape has been accomplished. Hence, the moulding flanges may, for example, have different widths along the length of the fastening profiles or fastening profile pieces. Subsequently, an ornamental moulding is provided. The component used as ornamental moulding is preferably a drawn or stamped component having a high-quality surface. The ornamental moulding is then crimped onto the moulding flange of the fastening profile piece or onto the moulding flanges of the adjoining fastening profile pieces so that the edge portions of the ornamental moulding will enclose the moulding flange on its edges. It is thus possible to establish any shape of the window frame 7, 8.

Following this, sealing profiles can be installed in the undercuts provided in the fastening profiles or fastening profile pieces and the complete window frame can, in this form, be installed in the frame of a vehicle door.

Depending on the respective mounting direction, it is, however, also possible to attach the seals or sealing profiles to the frame of the vehicle door and to attach the fastening profiles, which have the ornamental mouldings applied thereto, to the seals. In this case, the seals can be fastened with clips to the vehicle frame and the fastening profile having the ornamental moulding attached thereto can be lockingly engaged behind the clips.

Also the ornamental moulding according to the second embodiment (FIG. 6) is produced in the way described hereinbefore.

The invention claimed is:

1. A window frame for a window of a passenger car, comprising at least one seal having one or a plurality of sealing profiles that abut another sealing profile at seams in the longitudinal direction of the seal, and further comprising a fastening profile which is separate from the sealing profiles, the fastening profile cooperating with the seal and comprising one or a plurality of fastening profile pieces that abut one another on at least one seam in the longitudinal direction of the fastening profile, the fastening profile pieces having attached thereto a metal ornamental moulding characterized in that the fastening profile piece or pieces is/are provided with a moulding flange and with at least one fastening element for fastening the fastening profile to the passenger car, and that the ornamental moulding is crimped on the moulding flange of the fastening profile piece or pieces such that the ornamental moulding covers the at least one seam in one piece.

2. A window frame according to claim 1, characterized in that the fastening profile is provided with at least one undercut for engaging the seal.

3. A window frame according to claim 1 or claim 2, characterized in that the fastening profile comprises an extrudable material.

4. A window frame according to claim 1 or claim 2, characterized in that the moulding flanges of the fastening profile pieces have different widths in the longitudinal direction of the fastening profile pieces.

5. A window frame according to claim 1 or claim 2, characterized in that the ornamental moulding is configured as an integral component.

6. A window frame according to claim 1 or claim 2, characterized in that the fastening profile pieces have different configurations.

7. A window frame according to claim 1 or claim 2, characterized in that the at least one fastening element of the fastening profile pieces is inserted in the sealing profiles and that the fastening profile is fixed to the passenger car in this way.

8. A window frame according to claim 1 or claim 2, characterized in that the at least one fastening element of the fastening profile pieces is attached to a frame of the passenger car and that the fastening profile is fixed to the passenger car in this way.

9. A window frame according to claim 1 or claim 2, characterized in that the window frame encloses a movable side window and a fixed side window.

10. A window frame according to claim 1 or claim 2, characterized in that the window frame encloses only a sub-area of a window.

11. A method of producing the window frame according to claim 1 or claim 2, characterized by the following steps:
  providing at least one fastening profile piece comprising a moulding flange, said moulding flange having an excess width,
  processing the moulding flange of the at least one fastening profile piece along the width of the moulding flange so as to obtain the desired shape of the moulding flange, and
  crimping the ornamental moulding onto the processed moulding flange.

12. A method according to claim 11, characterized in that the width of the moulding flange of the at least one fastening profile piece is cut so that the moulding flange will have different widths in the longitudinal direction of the fastening profile piece.

13. A method according to claim 11, characterized in that a plurality of fastening profile pieces is provided, that the moulding flanges of the fastening profile pieces are processed and that the ornamental moulding is crimped onto the moulding flanges of all the fastening profile pieces.

14. A method according to claim 11, characterized in that the at least one fastening profile piece is cut to provide the fastening profile piece with at least one undercut, and that at least one sealing profile is installed in said undercut.

15. A method according to claim 11 wherein the window frame is characterized in that the fastening profile comprises an extrudable material.

16. A method according to claim 11 wherein the window frame is characterized in that the moulding flanges of the fastening profile pieces have different widths in the longitudinal direction of the fastening profile pieces.

17. A method according to claim 11 wherein the window frame is characterized in that the ornamental moulding is configured as an integral component.

18. A method according to claim 11 wherein the window frame is characterized in that the at least one fastening element of the fastening profile pieces is inserted in the sealing profiles and that the fastening profile is fixed to the passenger car in this way.

19. A window frame according to claim 3 wherein the fastening profile comprises an extruded metal profile.

20. A window frame according to claim 3, characterized in that the moulding flanges of the fastening profile pieces have different widths in the longitudinal direction of the fastening profile pieces.

21. A window frame according to claim 3, characterized in that the ornamental moulding is configured as an integral component.

22. A window frame according to claim 4, characterized in that the ornamental moulding is configured as an integral component.

23. A window frame according to claim 3, characterized in that the at least one fastening element of the fastening profile pieces is inserted in the sealing profiles to fix the fastening profile to the passenger car.

24. A window frame according to claim 4, characterized in that the at least one fastening element of the fastening profile pieces is inserted in the sealing profiles to fix the fastening profile to the passenger car.

25. A window frame according to claim 3, characterized in that the at least one fastening element of the fastening profile pieces is attached to a frame of the passenger car to fix the fastening profile to the passenger car.

26. A window frame according to claim 4, characterized in that the at least one fastening element of the fastening profile pieces is attached to a frame of the passenger car to fix the fastening profile to the passenger car.

\* \* \* \* \*